United States Patent Office 3,366,653
Patented Jan. 30, 1968

3,366,653
METHOD OF PREPARING STEROIDS
Rudolf Wiechert, Friedmund Neumann, and Hans-Günter Lehmann, Berlin, Germany, assignors to Schering A.G., Berlin, Germany
No Drawing. Filed July 6, 1965, Ser. No. 469,854
1 Claim. (Cl. 260—397.4)

ABSTRACT OF THE DISCLOSURE 1,2β-methylene-17α-hydroxyprogesterone and its 17α-acetate, having strongly estrogenic properties, are prepared from the corresponding 1,2β-methylene-5α-pregnanes by dehydrogenation with selenium dioxide, or 2,3-dichloro-5,6-dicyanobenzoquinone, or chloranil.

---

This invention relates to a method of preparing derivatives of 1,2β-methylene-17α-hydroxyprogesterone which will hereinafter be abbreviated as X:X and shown as

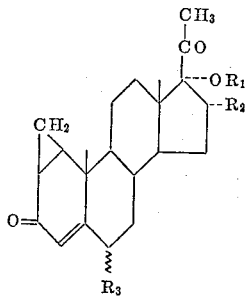

wherein $R_1$ is hydrogen or the acyl radical of a carboxylic acid, $R_2$ is hydrogen or methyl, $R_3$ is hydrogen, α- or β-methyl, or α or β-fluorine. All acyl radicals usual in steroid chemistry are suitable sources of acyl radicals $R_1$. Preferred acyl radicals contain one to eleven carbon atoms, as in acetic, propionic, capronic, enanthic, undecanoic acid and the like. These acyl radicals also may be substituted in the usual manner. Suitable substituted acyl radicals of carboxylic acids having 1 to 11 C atoms are those of phenylacetic acid, cyclopentylpropionic acid, the halo-acetic acids, aminoacetic acid, oxypropionic acid, etc.

The novel derivatives of X:X are characterized by superior gestation producing effect when applied subcutaneously or orally.

The strong gestagenic effect of the novel derivatives of X:X is shown in the following Table 1 with reference to X:X acetate (I) as compared to the known gestagenic agents II–IV. The gestagenic effect of the several compounds was determined in infantile female rabbits by the usual Clauberg test.

TABLE 1

| Substance: | By mouth WD 50 (mg.) |
|---|---|
| (I) 1,2β - methylene - 17α-hydroxyprogesterone-acetate | 0.01 |
| (II) 17α-hydroxyprogesterone-acetate | 1.0 |
| (III) 6α - methyl - 17α - hydroxyprogesterone-acetate | 0.1 |
| (IV) 19 - nor-17α-hydroxyprogesterone-acetate | 0.1 |
| (V) 17α-ethinyl-19-nor-testerone | 0.13 |
| (VI) 6 - chloro-6-dehydro-17α-hydroxyprogesterone-acetate | 0.03 |

The new derivatives of X:X are compounded with additives, carriers, and the like as is conventional in pharmaceutical practice to facilitate their therapeutic application. Tablets, sugar coated pills, capsules, pills, suspensions, and solutions of the active agents of the invention may be prepared by well-known methods.

The new derivatives of X:X of the formula

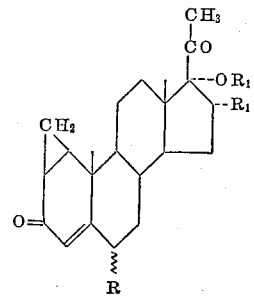

wherein $R_1$, $R_2$, $R_3$ are the substituents referred to above and may be prepared from 1,2β-methylene-steroids of the formula

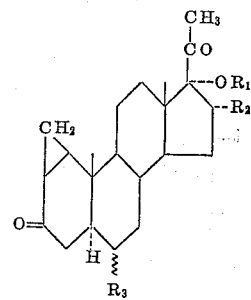

by methods known per se. Selenium dioxide, 2,3-dichloro-5,6-dicyanobenzoquinone or chloranil are preferred dehydrogenating agents. If there is a free 17α-hydroxyl group in the starting material the corresponding ester may be formed with the desired acid or with a reactive derivative, namely, acyl chlorides and other halides, anhydrides, esters to obtain an acyl radical at $R_1$. Conversely, an acyloxy radical initially present in position 17 may be removed by saponification in a conventional manner. All the acids commonly employed in steroid chemistry for esterifying steroid alcohols may be employed for esterification, and esters of all these acids may be saponified.

The compounds of 5α-series and of the 5β-series which are useful starting materials for synthesizing the compounds of the invention may be produced from known compounds by known methods which are represented by the following formulas:

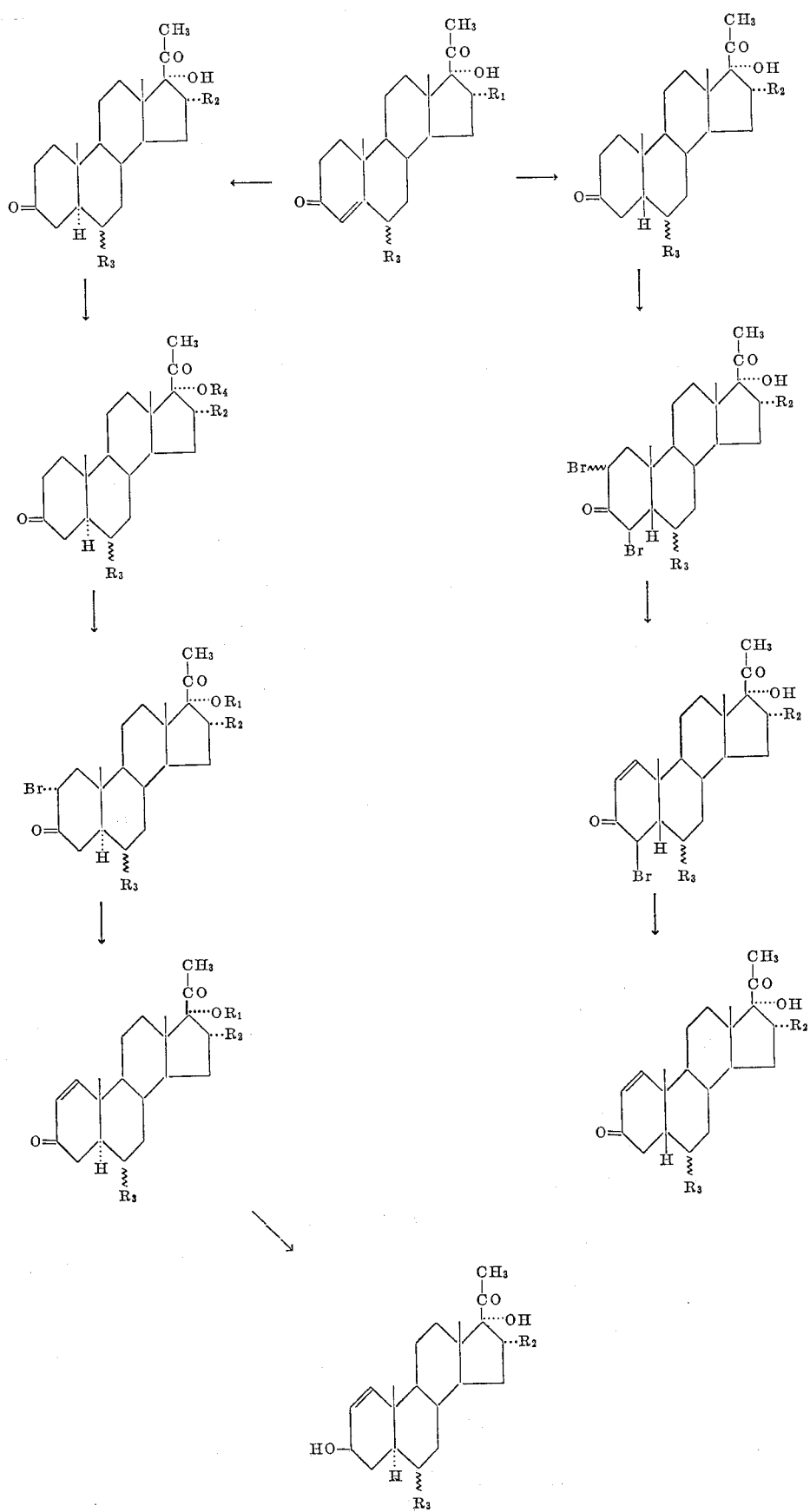

By way of example, the 1,2β, methylene-5α-pregnane-17α-ol-3,20-dione acetate (M.P. 253–255° C.) may be prepared by reducing Δ¹-5α-pregnene-17α-ol-3,20-dione acetate with lithium tri-tert-butoxy-aluminum hydride to the corresponding 3β-ol (M.P. 180–185°C.), adding methylene by means of methylene iodide and copper coated zinc dust and oxidizing the 1,2β-methylene-5α-pregnene-3β,17α-diol-20-one-17-acetate (M.P. 158.5–161° C.) so obtained by means of chromic acid.

*Example 1*

One gram 1,2β-methylene-5α-pregnane-17α-ol-3,20-dione acetate was dissolved in 20 ml. absolute benzene, and 1 g. 2,3-dichloro-5,6-dicyanobenzoquinone was added. The mixture was refluxed. After 12 hours, additional 0.5 g. 2,3-dichloro-5,6-dicyanobenzoquinone were added, and two further additions of 0.5 g. and 1.0 grams respectively were made at intervals of 12 hours. The reaction product was taken up in benzene. Insoluble material was removed by filtration and washed with benzene. The organic phase was washed successively with aqueous sodium carbonate solution, water, and sodium chloride solution, and was then dried. It was evaporated in a vacuum to about 100 ml., and chromatographed on 100 g. silica gel. The adsorbed material was eluted with a 5% solution of ethyl acetate in methylene chloride, and 550 mg. crude 1, 2β-methylene-17α-acetoxyprogesterone was recovered. After recrystallization from diisopropyl ether, there were obtained 310 mg. of a pure product of melting point 191.5–192° C. $E_{243}=12,600$.

*Example 2*

When one gram 1,2β-methylene-5α-pregnane-17α-ol-3, 20-dione was reacted in a manner analogous to the procedure of Example 1, there were obtained 350 mg. 1,2β-methylene-17α-hydroxyprogesterone. M.P. 190.5–191.5° C. $E_{245}=11,400$.

While a preferred method of producing a compound X:X and derivatives thereof have been described and illustrated it is to be noted that modifications thereof may be made without departing from the scope and spirit of the invention as herein claimed.

We claim:

1. A method of preparing derivatives of X:X having the formula

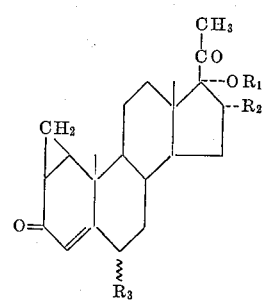

wherein $R_1$ is a member of the group consisting of hydrogen and the acyl radical of a carboxylic acid; $R_2$ is a member of the group consisting of hydrogen and methyl; $R_3$ is a member of the group consisting of hydrogen, α-fluorine, β-fluorine, α-methyl, and β-methyl, which comprises dehydrogenating a compound of the formula

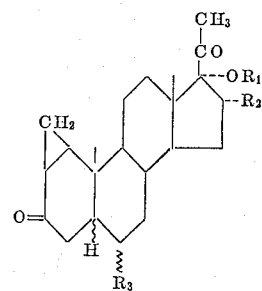

wherein $R_1$, $R_2$, $R_3$ are said members of said groups, by means of an agent selected from the group consisting of selenium dioxide, 2,3-dichloro-5,6-dicyanobenzoquinone, and chloranil, and additionally esterifying an initially present hydroxyl group in position 17α with a substance selected from the group consisting of a carboxylic acid having 1 to 11 carbon atoms and its acyl halides, anhydrides.

References Cited

UNITED STATES PATENTS 3,127,396   3/1964   Weichert et al. ____ 260—239.5

ELBERT L. ROBERTS, *Primary Examiner.*